W. H. KEMPTON, B. J. GUDGE AND F. P. LAUFFER.
METHOD OF FORMING STREAM LINE BODIES.
APPLICATION FILED SEPT. 25, 1919.
1,344,765.  Patented June 29, 1920.
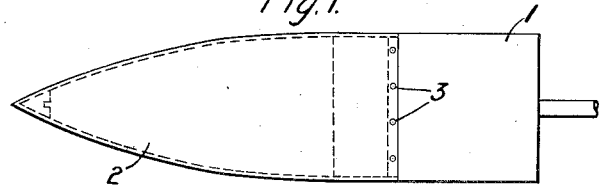
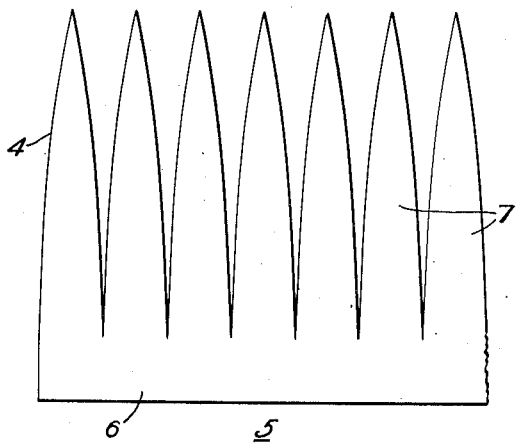
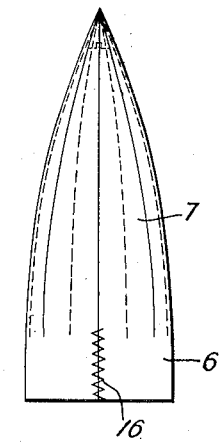
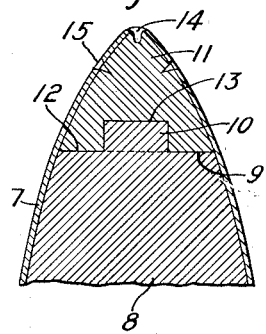
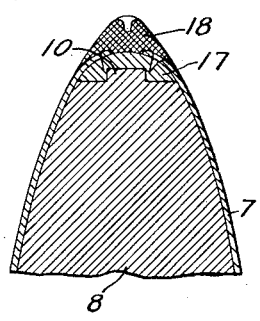
WITNESSES:
H. J. Shelhamer
W. H. Woodman
INVENTORS
Willard H. Kempton,
Benjamin J. Gudge,
Frank P. Lauffer.
BY
Wesley G. Carr
ATTORNEY

UNITED STATES PATENT OFFICE.

WILLARD H. KEMPTON AND BENJAMIN J. GUDGE, OF WILKINSBURG, AND FRANK P. LAUFFER, OF IRWIN, PENNSYLVANIA, ASSIGNORS TO WESTINGHOUSE ELECTRIC AND MANUFACTURING COMPANY, A CORPORATION OF PENNSYLVANIA.

METHOD OF FORMING STREAM-LINE BODIES.

1,344,765.        Specification of Letters Patent.      Patented June 29, 1920.

Original application filed July 25, 1918, Serial No. 246,768. Divided and this application filed September 25, 1919. Serial No. 326,222.

*To all whom it may concern:*

Be it known that we, WILLARD H. KEMPTON, a citizen of the United States, and a resident of Wilkinsburg, in the county of Allegheny and State of Pennsylvania, BENJAMIN J. GUDGE, a citizen of the United States, and a resident of Wilkinsburg, in the county of Allegheny and State of Pennsylvania, and FRANK P. LAUFFER, a citizen of the United States, and a resident of Irwin, in the county of Allegheny and State of Pennsylvania, have invented a new and useful Improvement in Methods of Forming Stream-Line Bodies, of which the following is a specification, this application being a division of application Serial No. 246,768, filing date, July 25, 1918.

Our invention relates to stream-line casings and more particularly to stream-line casings or tail-pieces for the generators of aircraft wireless installations, and it has, for its object, the provision of a laminated, molded body of hollow stream-line design, which may be readily applied to, or removed from, the casing proper of the generator and which, as a rule, will partially inclose the generator casing.

A still further object which we have in mind is the provision of a novel means of building up the body of the casing, from sheets of suitably-impregnated fibrous material, in such manner that the built-up body, consisting of a plurality of sheets or layers of such material in superimposed relation, may be positioned in a mold and there be suitably treated to harden the impregnating binder and to give proper shape and finish to the resultant stream-line casing.

We prefer, in practising our invention, to be able to employ fabric sheets, woven in the usual manner, paper or sheets of cotton batting. For this reason, another object which we wish to accomplish is the development of a suitable pattern for cutting the sheet material from a flat sheet in such manner that it may be assembled smoothly and evenly in the desired stream-line shape, either by assembling it about the core of a mold or about a form of suitable character.

We have found, from practice, that the above mentioned object may be accomplished by cutting the several sheets, constituting the body of the casing, in such manner that each sheet includes one continuous marginal edge portion or band from one side of which a plurality of tapering pointed streamers project, the bands in the assembled article making up the larger open end of the casing and the streamers being drawn together, edge to edge, to form the tapering end or point of the stream-lining.

Although various methods of holding the assembled streamers, of the successive laminations of sheet material, may be devised and employed, we have found that a convenient method is to provide a relatively small, properly shaped wooden block to form a support for the smaller end or point of the casing in order that the several streamers may be tacked, or otherwise secured, to the block and be so held in place throughout the various steps of assemblage and during the positioning of the assembled body upon its core and within a suitable mold.

In the drawings, in which similar reference numerals indicate corresponding parts throughout, Figure 1 is a side elevation of a generator, such as is employed in aircraft wireless installations, showing our improved stream-line casing or tail-piece applied; Fig. 2 is a fragmentary plan of a sheet cut to proper shape for use in building the casing; Fig. 3 is a side elevation of the finished casing; Fig. 4 is a fragmentary axial section showing the smaller end of the casing, together with the reinforcing wooden block and the adjacent portion of a form used in assembling the casing; Fig. 5 is a corresponding view showing a modified form of construction.

Primarily, our invention resides in the construction of a hollow casing or tail-piece for wireless generators by forming a properly-stream-line, hollow, laminated body of a suitable fibrous sheet material impregnated with a binder. Various fibrous sheet materials may be employed, such as a closely matted calendered material, as paper, a woven fabric, such as duck, or a loosely matted spinnable fibrous sheet material, such as cotton batting. If deemed advisable, various combinations of the above-mentioned sheet materials may be employed and, in any event, any one of a number of impregnating materials may be used. Impregnating materials suitable for the purpose include shellac, copal, casein, marine glue or a phenolic condensation product, such as bakelite. As a rule, we prefer the use of bakelite because of the fact that a laminated body impregnated with bakelite may be rendered hard and impervious to water, oils and acids by the application of heat and pressure and for the further reason that the mere molding of such a body, by the application of heat and pressure, provides an extremely smooth and highly polished surface which materially reduces air friction when the body is employed for stream-linings or like purposes.

In Fig. 1 we have conventionally illustrated a generator 1 having its usual casing, the generator being located partly within our improved stream-line casing or tail-piece 2 and partly in advance of it, as shown. Preferably, that portion of the generator casing which is seated within the larger end of the tail-piece is reduced in diameter to receive such larger end in order that the exterior surfaces of the two may merge smoothly into each other. Screws 3, rivets or other suitable means may be employed for detachably or permanently securing the tail-piece in place. The tail-piece is hollow in construction and may preferably be circular in cross section, being open at its larger end and tapering to a point at its smaller end, the degree of this taper increasing in abruptness from somewhat to the rear of the larger end to the point of the casing, itself.

Although various means may be employed for fitting suitably impregnated sheets of fibrous material to bring them to the desired shape and to still keep the wall of the tail-piece smooth and of uniform thickness, we prefer to cut, or otherwise form, the sheets employed in the manner illustrated in Fig. 2. To accomplish this, a form of the desired shape and dimensions may first be made and the circumferences of this form, at spaced intervals from end to end, may be measured. These circumferences may then be divided into an equal number of parts and the parts so obtained may be laid off upon a plain surface to plot the curved lines 4 of Fig. 2. By this means, a pattern is provided from which sheets of suitably impregnated fibrous material 5 may be cut. Each of these sheets, as shown in Fig. 2, includes an uninterrupted marginal edge portion or band 6 and a plurality of streamers 7 projecting laterally from one side of the band 6. These streamers 7 taper from the band portion 6 to the ends of the streamers which terminate in points, the side edges of the streamers being slightly curved for a reason which will be later apparent. The number of streamers, for any one pattern, is of course dependent upon the dimensions of the stream-line casing to be formed but should preferably be as small as possible because the time required in assembling or building up the casing increases in proportion to the increase in the number of the streamers. For this reason, the number of parts into which the circumference shall be divided, and, consequently, the number of streamers which the pattern shall have may best be determined by experiment in each individual case.

In assembling the body of a stream-line tail-piece, according to our invention, the band portions 6 of the various layers of laminations of sheet material are drawn tightly about the larger end of a suitable form or core, and the streamers of the several bands are laid against such form or core with their points brought together, at the point of the form, in such manner that the edges of each streamer engage smoothly against the edge of adjacent streamers, care being taken that the streamers of each successive layer shall break joints with the streamers of adjacent layers.

In order to facilitate this assembling of the several pre-shaped sheets about the form, we may provide a small wooden block to which the points of the streamers may be secured and which constitutes a permanent part of the finished structure, and construct the form upon which the body is built up, as well as the core upon which it is molded, in a peculiar manner to detachably receive this block and hold it in place. Such an arrangement is shown in Fig. 4 in which 8 represents the smaller end of a form, this end being cut away at right angles to the axis of the form to provide a plain-surface face 9 having a central, and preferably cylindrical, projection 10. The wooden block 11 has a plain-surface face 12 for engagement against the face 9 of the form and a recess 13 to snugly receive the projection 10 so that, when the block is applied to the form, it is detachably held in axial alinement with it. This block corresponds in shape to the shape of the smaller end or point of the stream-line tail-piece, as indicated in Figs. 1 and 3, save that, at its point, it is formed with a shallow recess or depression 14 which facilitates centering of the article in a mold and which also provides an easy means by which a hole may be bored through the block after the casing is finished in order that lead wires may be brought through the point of the tail-piece, if desired.

With the block 11 properly placed upon the form 8, the first sheet of suitably shaped material is wrapped about the form, and the ends of its streamers are brought into position against the block and secured in place by small tacks 15 or other suitable fastening means. Further layers of sheet material are then successively applied until a body of the desired thickness has been formed. The ends of the streamers of the several layers being each secured to the block, the inner layers being preferably tacked to the larger or base portion of the block and the outer layers to the block at positions nearer its point. The free ends of the band portions 6 of the several layers may be drawn tightly together about the larger end of the form and secured by crossstitching 16, as shown in Fig. 3, but, as a rule, we have found that, if care is taken in assembling the laminated body, there is no necessity for stitching the edges of any band except that of the outermost layer together. Instead of using several sheets, a single sheet of suitable length may be wound spirally about the form.

After the body has thus been built up or assembled, it may be lifted from the form and placed upon a correspondingly-shaped core and then, together with its core, placed in a suitable mold and there treated to harden and compact it. This treatment or curing may be done in various ways, depending upon the adhesive or impregnating material employed. For instance, if shellac has been employed as the impregnating material, the body, while in its mold, will be subjected to heat and pressure to soften the shellac and to compress the several impregnated layers making up the body after which the mold will be cooled, while the body is still held under pressure, to harden the shellac.

On the other hand, if a phenolic condensation product is employed as a binder, the article will be subjected to the combined action of heat and pressure while in its mold, the heat being continued until such time as the binder shall have reached its hard and substantially insoluble and infusible state. This molding, if the mold surfaces be highly polished or somewhat oiled, will insure not only a smooth but a highly polished surface upon the stream-line tail-piece so that it will offer but little skin friction to the passage of air during its use.

In some instances, particularly upon small tail-pieces or casings of the character illustrated, it may be difficult to assemble the ends of the streamers accurately and to mold them carefully enough to obtain a strong and neat point. Under these circumstances, a slightly different method may be followed, such as that illustrated in Fig. 5. As there shown, the wooden block 17, corresponding to the block 11, instead of being pointed is substantially semi-spherical in outline and the ends of the streamers are cut a little short and tacked on so that their ends do not quite come together at a point. With this arrangement, a suitable quantity of any preferred molding composition 18 may be applied to the point of the built-up body just previous to its being positioned in the mold. Such molding composition may comprise any suitable inert filler, such as asbestos, wood-flour, ground duck or the like, impregnated with a suitable adhesive, as a binder, preferably the same adhesive as that employed in impregnating the sheet material. Obviously, under these circumstances, this added molding composition will be pressed into shape when the article is pressed and heated in the mold, and a strong and finished point for the tail-piece will be provided, as a result.

Although we have illustrated and described a stream-line tail-piece for generators or aircraft wireless installations produced by a preferred method, it will be appreciated that various changes in the method of procedure may be resorted to, particularly if the method is being practised for the formation of hollow bodies having curved surfaces of various characters. We, therefore, reserve the right to make any changes which may come within the scope of the claims.

We claim as our invention:

1. The method of forming a stream-line structure which comprises cutting impregnated fibrous sheet material to fit smoothly about a core substantially circular in cross section and tapering from end to end, superimposing a plurality of layers of the cut sheet material about the core and subjecting the body so assembled to heat and pressure in a mold.

2. The method of forming a stream-line structure which comprises cutting impregnated fibrous material to provide a banded portion and laterally directed tapering streamers, superimposing layers of the cut sheet material about a core, with the edges of adjacent streamers engaging each other, and subjecting the body thus assembled to heat and pressure to harden its binder.

3. The method of forming a stream-line structure which comprises positioning a reinforcing block of substantially conical shape against the smaller end of a substantially frusto-conical form, cutting impregnated fibrous sheet material to provide sheets having a marginal band portion and laterally directed tapered streamers, superimposing such sheets about the form and reinforcing block with the edges of the streamers engaging each other and with the streamers of each layer breaking joints with those of other layers, securing the tapered ends of the streamers to the reinforcing block, removing the form, applying the assembled body to a core and subjecting the assembled body to heat and pressure in a mold.

4. The method of forming a stream-line structure which comprises cutting impregnated fibrous sheet material to provide a banded portion and laterally directed tapering streamers, superimposing layers of the cut sheet material to form a body of the desired shape, securing the layers together in assembled position, and molding the hollow body thus formed by the application of heat and pressure.

5. The method of forming a stream-line structure which comprises cutting impregnated fibrous sheet material to permit assembling in the desired form, superimposing layers of the sheet material about a form of the desired shape, securing the several layers in their assembled position, applying the body thus assembled to a core and subjecting the body to heat and pressure in a mold to cure the impregnating agent.

6. The method of forming a stream-line structure which comprises cutting fibrous sheet material, which has been impregnated with a binder capable of being hardened by heat and pressure, to provide a banded portion and laterally directed tapering streamers, superimposing layers of the cut material about a form to provide a body of the desired shape, securing the free ends of the streamers to a reinforcing element whereby the layers are held in assembled position, and removing the body thus assembled from the form and subjecting it to heat and pressure in a mold to compact the assembled sheets and harden the binder.

In testimony whereof we have hereunto subscribed our names this 2nd day of Sept., 1919.

WILLARD H. KEMPTON.
BENJAMIN J. GUDGE.
FRANK P. LAUFFER.